(12) United States Patent
Okaji et al.

(10) Patent No.: US 9,267,591 B2
(45) Date of Patent: Feb. 23, 2016

(54) TORQUE CONVERTER STATOR STRUCTURE

(75) Inventors: Tomoya Okaji, Wako (JP); Hiroya Abe, Wako (JP); Yoshitaka Mishima, Wako (JP); Tomohiko Usui, Wako (JP); Akira Kitajima, Hamamatsu (JP); Tomohiko Tsuchiya, Hamamatsu (JP)

(73) Assignees: HONDA MOTOR CO., LTD., Tokyo (JP); YUTAKA GIKEN CO., LTD., Hamamatsu-shi (JP)

( * ) Notice: Subject to any disclaimer, the term of this patent is extended or adjusted under 35 U.S.C. 154(b) by 210 days.

(21) Appl. No.: 14/125,778

(22) PCT Filed: Jun. 20, 2012

(86) PCT No.: PCT/JP2012/065735
§ 371 (c)(1),
(2), (4) Date: Dec. 12, 2013

(87) PCT Pub. No.: WO2012/176803
PCT Pub. Date: Dec. 27, 2012

(65) Prior Publication Data
US 2014/0123637 A1    May 8, 2014

(30) Foreign Application Priority Data

Jun. 24, 2011    (JP) ................................ 2011-140320

(51) Int. Cl.
*F16H 41/26*    (2006.01)
*F16H 41/28*    (2006.01)
(Continued)

(52) U.S. Cl.
CPC ................ *F16H 41/26* (2013.01); *F16H 41/28* (2013.01); *F16H 45/02* (2013.01); *F16H 61/60* (2013.01); *F16H 2041/246* (2013.01); *F16H 2041/285* (2013.01)

(58) Field of Classification Search
CPC ... F16H 41/26; F16H 41/28; F16H 2041/285; F16H 2041/246; F16H 61/60
USPC ..................................................... 60/345, 346
See application file for complete search history.

(56) References Cited

U.S. PATENT DOCUMENTS 2,612,754 A * 10/1952 Swift ...................... F03B 13/00
                                                          60/346
2,687,616 A *  8/1954 Kelley .................... F16H 61/60
                                                          60/345

(Continued)

FOREIGN PATENT DOCUMENTS

CN    101245843 A    8/2008
CN    101410654 A    4/2009
(Continued)

OTHER PUBLICATIONS

Office Action dated Jun. 30, 2015, issued in counterpart Chinese patent application No. 201280028575.3 (5 pages).
(Continued)

*Primary Examiner* — Edward Look
*Assistant Examiner* — Michael Quandt
(74) *Attorney, Agent, or Firm* — Westerman, Hattori, Daniels & Adrian, LLP

(57) ABSTRACT

Among first and second stators of a torque converter supported on a fixed part by a one-way clutch corresponding to the stators, the number of second stator blades of the second stator on the downstream side in the direction of flow of oils larger than the number of first blades of the first stator on the upstream side, and the maximum value t2 for blade thickness of the second stator blade is smaller than the minimum value t1 for blade thickness of the first stator blade. Therefore, it is possible to ensure that there is a sufficient gap (β) between a trailing edge of the first stator blade and a leading of the second stator blade, thus preventing the flow of oil from being stopped by the gap (β), and it is possible to align effectively the flow of oil by means of the second stator blades.

4 Claims, 15 Drawing Sheets

(51) Int. Cl.
*F16H 61/60* (2006.01)
*F16H 41/24* (2006.01)
*F16H 45/02* (2006.01)

(56) References Cited

U.S. PATENT DOCUMENTS

| | | | | |
|---|---|---|---|---|
| 2,944,441 A | * | 7/1960 | Russell | F16H 61/56 475/37 |
| 3,105,396 A | * | 10/1963 | Dundore | F16H 41/26 60/345 |
| 3,244,400 A | * | 4/1966 | Saunders | F16H 41/26 416/231 B |
| 3,677,004 A | * | 7/1972 | Muller | F16H 41/22 60/352 |
| 3,797,243 A | | 3/1974 | Trusov | |
| 2007/0220877 A1 | | 9/2007 | George et al. | |
| 2007/0224042 A1 | | 9/2007 | Brees et al. | |
| 2008/0194381 A1 | | 8/2008 | Maddock | |

FOREIGN PATENT DOCUMENTS

| | | |
|---|---|---|
| JP | 62-100365 U | 6/1987 |
| JP | 2-19969 U | 2/1990 |
| JP | 2003-287104 A | 10/2003 |
| JP | 2010-19355 A | 1/2010 |
| JP | 2011-52781 A | 3/2011 |

OTHER PUBLICATIONS

International Search Report dated Aug. 28, 2012 issued in corresponding application No. PCT/JP2012/065735.
Supplementry European Search Report dated Aug. 6, 2015, issued in counterpart European Application No. 12 80 2526 (2 pages).

* cited by examiner

TORQUE CONVERTER STATOR STRUCTURE

TECHNICAL FIELD

The present invention relates to a torque converter stator structure that includes a pump impeller that is connected to a drive source and rotates around an axis, a turbine runner that is connected to an input shaft of a transmission and rotates around the axis, and a stator that is disposed between the pump impeller and the turbine runner, the stator including a first stator that is positioned on an upstream side in a direction of circulation of oil and a second stator that is positioned on a downstream side in the direction of circulation, and the first and second stators being supported on a fixed part via corresponding one-way clutches.

BACKGROUND ART

A torque converter for an automobile includes a pump impeller connected to a crankshaft of an engine, a turbine runner connected to a main shaft of a transmission, and a stator supported on a casing via a one-way clutch, drives the turbine runner by means of a flow of oil generated by the pump impeller, and aligns, by means of the stator, the flow of oil that has passed through the turbine runner and been deflected, thus circulating oil along the pump impeller, the turbine runner, and the stator.

FIG. 14 (A) shows a row of blades of a stator 01 of a conventional high torque ratio type torque converter, and a stator blade 02 thereof has a large camber in order to achieve a high torque ratio. With regard to such a torque converter, in a region where the speed ratio (output rotational speed/input rotational speed) is small, oil that has passed through the turbine runner flows into the stator blade 02 from the ventral surface side and flows smoothly (arrow a), but in a region where the speed ratio is large, since oil that has passed through the turbine runner flows into the stator blade 02 from the dorsal surface side (arrow b), there is oil flow separation on the ventral surface side of the stator blade 02 where the camber is strong, and there is the problem that the torque ratio (output torque/input torque) becomes less than 1 or the capacity coefficient (input torque/input rotational speed) decreases greatly.

Conventionally, in such a case a one-way clutch supporting the stator 01 on the casing is disengaged, and the stator 01 is made to idle in the direction of arrow c, thus suppressing any decrease in the speed of the stator blade 02 and thereby improving performance.

FIG. 15 shows changes, in response to speed ratio, of the torque ratio and the capacity coefficient of a high torque ratio type torque converter (solid line) and a high capacity type torque converter (broken line). The high torque ratio type torque converter has an excellent torque ratio in a low speed ratio region compared with the high capacity type torque converter, but there is the problem that the capacity coefficient in a high speed ratio region is still low.

In order to further improve the capacity coefficient in the high speed ratio region, as shown in FIG. 14 (B), an arrangement in which a stator blade 02 of a stator 01 is divided into a first stator blade 02a on the upstream side in the direction of flow of oil and a second stator blade 02b on the downstream side in the direction of flow of oil, and the first stator blade 02a and the second stator blade 02b are supported on a casing by respective one-way clutches so that they can idle independently from each other is known from Patent Document 1 below.

Due to the stator blade 02 being divided into the first stator blade 02a and the second stator blade 02b in this way, the first stator blade 02a is first made to idle in response to an increase in speed ratio, thus allowing the function of the second stator blade 02b in aligning the flow of oil to be exhibited, and in response to a further increase in the speed ratio both the first stator blade 02a and the second stator blade 02b are made to idle, thus preventing oil flow separation.

RELATED ART DOCUMENTS

Patent Documents

Patent Document 1: Japanese Utility Model Registration Application Laid-open No. 62-100365

DISCLOSURE OF INVENTION

Problems to be Solved by the Invention

However, in the invention described in Patent Document 1 above there is a possibility that, as shown in FIG. 14 (B), when the first stator blade 02a is idling and the second stator blade 02b is fixed, in a state in which the position of the first stator blade 02a relative to the second stator blade 02b is displaced by half the blade row pitch, a gap a formed between the trailing edge of the first stator blade 02a and the leading edge of the second stator blade 02b will become extremely small and the flow of oil will be inhibited in the area of the gap a, thus degrading the performance.

The present invention has been accomplished in light of the above-mentioned circumstances, and it is an object thereof to achieve a balance between improvement of the torque ratio and improvement of the capacity coefficient of a torque converter.

Means for Solving the Problems

In order to attain the above object, according to a first aspect of the present invention, there is provided a torque converter stator structure comprising a pump impeller that is connected to a drive source and rotates around an axis, a turbine runner that is connected to an input shaft of a transmission and rotates around the axis, and a stator that is disposed between the pump impeller and the turbine runner, the stator comprising a first stator that is positioned on an upstream side in a direction of circulation of oil and a second stator that is positioned on a downstream side in the direction of circulation, and the first and second stators being supported on a fixed part via corresponding one-way clutches, characterized in that the number of blades of one stator of the first and second stators is larger than the number of blades of the other stator, and the maximum value for blade thickness of the blade of the one stator is smaller than the minimum value for blade thickness of the blade of the other stator.

Further, according to a second aspect of the present invention, in addition to the first aspect, wherein the length in the axis direction of a radially outer end part of the blade of the one stator is larger than the length in the axis direction of a radially inner end part of the blade.

Furthermore, according to a third aspect of the present invention, in addition to the first or second aspect, wherein the blade of the one stator is made by metal plate pressing and the blade of the other stator is made by die-casting.

A main shaft 13 of an embodiment corresponds to the input shaft of the present invention, a torque converter case 38 of the embodiment corresponds to the fixed part of the present invention, a first stator blade 42 and a second stator blade 46 of the embodiment correspond to the blade of the stator of the present invention, and a first one-way clutch 44 and a second one-way clutch 48 of the embodiment correspond to the one-way clutch of the present invention.

Effects of the Invention

In accordance with the first aspect of the present invention, in a region where the speed ratio of the torque converter is small, the first and second one-way clutches are both engaged, the first and second stators are both restrained on the fixed part, and oil flows along the blades of the first and second stators and its flow is aligned in a desired direction. When the direction of flow of oil entering the stator changes accompanying an increase in the speed ratio, since the first one-way clutch is disengaged and the first stator idles to thus prevent the speed of the first stator blade from decreasing, oil flows along the second stator blade of the second stator and the flow is aligned in a desired direction. In a region where the speed ratio is large, since the direction of flow of oil entering the stator further changes, the first and second one-way clutches are both disengaged, the first and second stators both idle, and oil can flow out in a desired direction without interference from the first and second stator blades.

Since, of the first and second stators, the number of blades of one stator is larger than the number of blades of the other stator, and the maximum value for the blade thickness of the blade of the one stator is smaller than the minimum value for the blade thickness of the blade of the other stator, it is possible to ensure that there is a sufficient gap between the trailing edge of the first stator blade and the leading edge of the second stator blade, thus preventing the flow of oil from being stopped by the gap, and it is possible to align effectively the flow of oil by means of the stator blades of the one stator, which are larger in number, thereby achieving a balance between improvement of the torque ratio and improvement of the capacity coefficient of the torque converter.

Furthermore, in accordance with the second aspect of the present invention, since the length in the axial direction of the radially outer end part of the blade of the one stator is larger than the length in the axial direction of the radially inner end part of the blade, it is possible to enhance the effect in aligning the flow of oil by increasing the chord length of the blade.

Moreover, in accordance with the third aspect of the present invention, since the blade of the one stator is made by metal plate pressing, it can be produced at low cost. Furthermore, although the blade of the other stator is made by die-casting, since the stator is divided into two, compared with a case in which it is not divided, warpage of the blade of the other stator becomes smaller, and the structure of a mold can be simplified, thus cutting the production cost.

EXPLANATION OF REFERENCE NUMERALS AND SYMBOLS

12 Pump impeller
13 Main shaft (input shaft)
14 Turbine runner
15 Stator
38 Torque converter case (fixed part)
40 First stator
41 Second stator
42 First stator blade (blade of stator)
44 First one-way clutch (one-way clutch)
46 Second stator blade (blade of stator)
48 Second one-way clutch (one-way clutch)
L Axis

BEST MODE FOR CARRYING OUT THE INVENTION

Modes for carrying out the present invention are explained below by reference to the attached drawings.

First embodiment

A first embodiment of the present invention is now explained by reference to FIG. 1 to FIG. 5.

Figure 1:
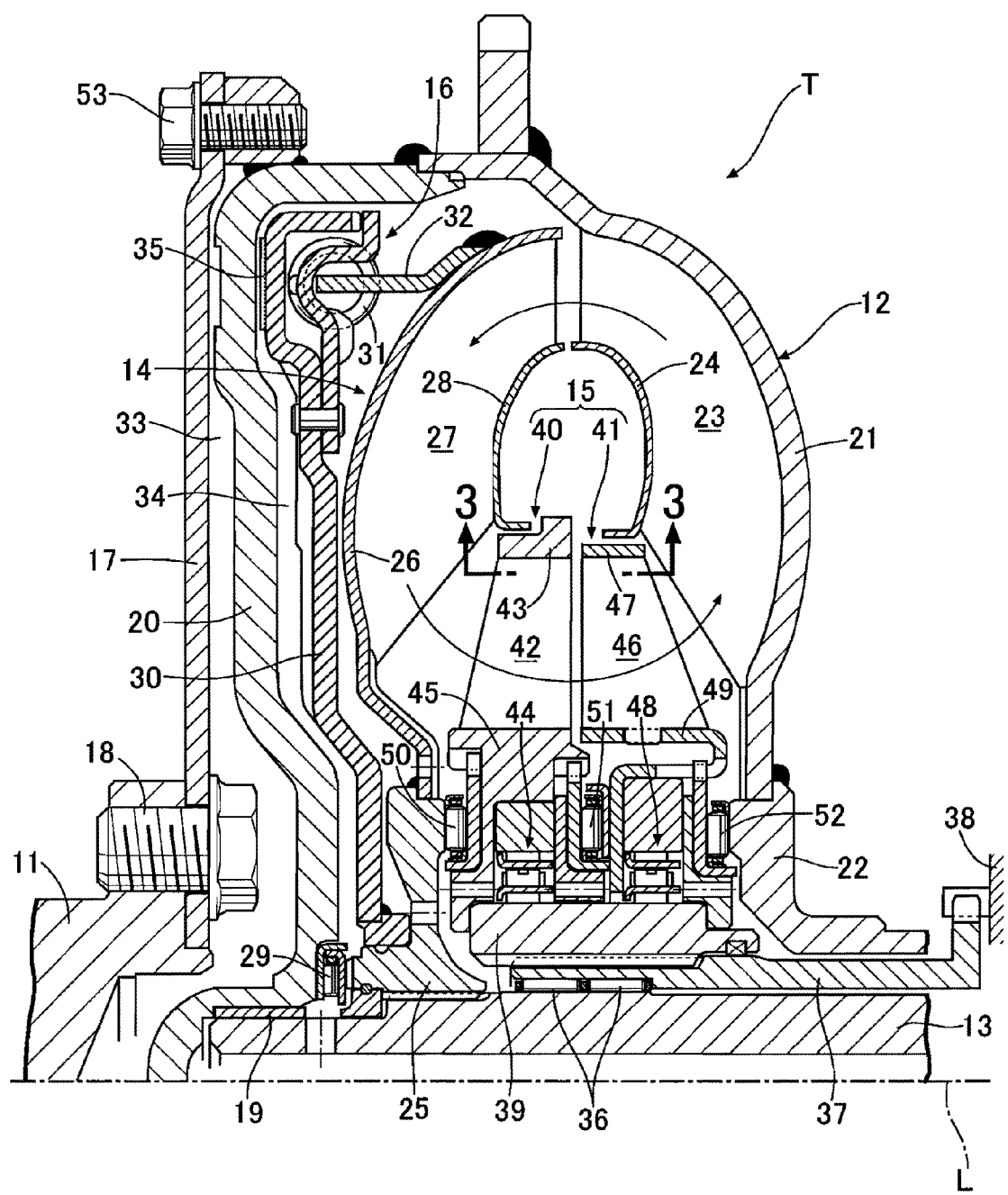
FIG. 1 is a vertical sectional view of a torque converter. (first embodiment)

As shown in FIG. 1, a torque converter T for an automobile includes a pump impeller 12 that is connected to a crankshaft 11 of an engine (not illustrated) as a drive source, a turbine runner 14 that is connected to a main shaft 13 of a transmission (not illustrated), a stator 15 disposed between the pump impeller 12 and the turbine runner 14, and a lockup clutch 16 that can join the pump impeller 12 and the turbine runner 14. The crankshaft 11 and the main shaft 13 are coaxially disposed on an axis L of the torque converter T in a state in which shaft ends thereof oppose each other.

A plate-shaped drive plate 17 is fixed to the shaft end of the crankshaft 11 by means of bolts 18, and an outer peripheral part of the drive plate 17 is fixed, by means of bolts 53, to an outer peripheral part of a bowl-shaped torque converter cover 20 rotatably supported on the shaft end of the main shaft 13 via a plain bearing 19.

The pump impeller 12 is formed from a pump shell 21 that is welded to an outer peripheral part of the torque converter cover 20, a pump boss 22 that is welded to an inner peripheral part of the pump shell 21 and surrounds the outer periphery of the main shaft 13, a plurality of pump blades 23 that are projectingly provided on an inner face of the pump shell 21, and a pump core 24 that provides a connection between the extremities of the pump blades 23. The turbine runner 14 is formed from a turbine boss 25 that is spline joined to a shaft end part of the main shaft 13, a turbine shell 26 that is welded to the turbine boss 25, a plurality of turbine blades 27 that are projectingly provided on an inner face of the turbine shell 26, and a turbine core 28 that provides a connection between the extremities of the turbine blades 27. A thrust bearing 29 is disposed between the turbine boss 25 and the torque converter cover 20.

A space bounded by the pump shell 21 and the turbine shell 26 is filled with oil, and the oil circulates in the space in the direction shown by the arrows accompanying rotation of the pump impeller 12.

The lockup clutch 16 includes a clutch piston 30 that is fitted onto an outer peripheral part of the turbine boss 25 so that it can slide in the axis L direction, and an outer peripheral part of the clutch piston 30 is connected to the turbine shell 26 via damper springs 31 and stays 32. A first oil chamber 33 is defined between the clutch piston 30 and the torque converter cover 20, and a second oil chamber 34 is defined between the clutch piston 30 and the turbine shell 26.

Therefore, when an oil pressure is supplied to the first oil chamber 33, the clutch piston 30 moves rightward in the figure so as to make a friction member 35 be detached from the torque converter cover 20, and the pump impeller 12 and the turbine runner 14 are thereby separated so as to be relatively rotatable. On the other hand, when an oil pressure is supplied to the second oil chamber 34, the clutch piston 30 moves leftward in the figure so as to make the friction member 35 abut against the torque converter cover 20 and the lockup clutch 16 be engaged, and the pump impeller 12 and the turbine runner 14 are thereby integrally joined, thus transmitting rotation of the crankshaft 11 directly to the main shaft 13.

A sleeve 37 is relatively rotatably fitted onto the outer periphery of the main shaft 13 via needle bearings 36 and 36, one end part of the sleeve 37 is retained on a torque converter case 38, and a tubular stator support member 39 is spline joined to the outer periphery of the sleeve 37. Therefore, the stator support member 39 is non-rotatably restrained on the torque converter case 38 via the sleeve 37.

The stator 15 is formed from a first stator 40 that is positioned on the upstream side in the direction of circulation of oil shown by the arrows and a second stator 41 that is positioned on the downstream side, and the first and second stators 40 and 41 are arranged side by side in the axis L direction. The first stator 40 includes, at the radially outer ends of a plurality of first stator blades 42, a first stator core 43 that extends to the turbine core 28 and includes, at the radially inner end, a first stator boss 45 that is supported on the stator support member 39 via a first one-way clutch 44. Furthermore, the second stator 41 includes, at the radially outer end of a plurality of second stator blades 46, a second stator core 47 that extends to the pump core 24 and includes, at the radially inner end, a second stator boss 49 that is supported on the stator support member 39 via a second one-way clutch 48.

A thrust bearing 50 is disposed between the turbine boss 25 and the first stator boss 45, a thrust bearing 51 is disposed between the first stator boss 45 and the second stator boss 49, and a thrust bearing 52 is disposed between the pump boss 22 and the second stator boss 49.

When the pump impeller 12 connected to the crankshaft 11 of the engine rotates, oil that is pushed out in the arrowed direction from the pump blades 23 of the pump impeller 12 acts on the turbine blades 27 of the turbine runner 14, giving a torque to the turbine runner 14 so as to rotate the main shaft 13 of the transmission, then passes through the first and second stator blades 42 and 46 of the first and second stators 40 and 41 and returns to the pump impeller 12, thereby transmitting the rotation of the crankshaft 11 to the main shaft 13.

Figure 2:
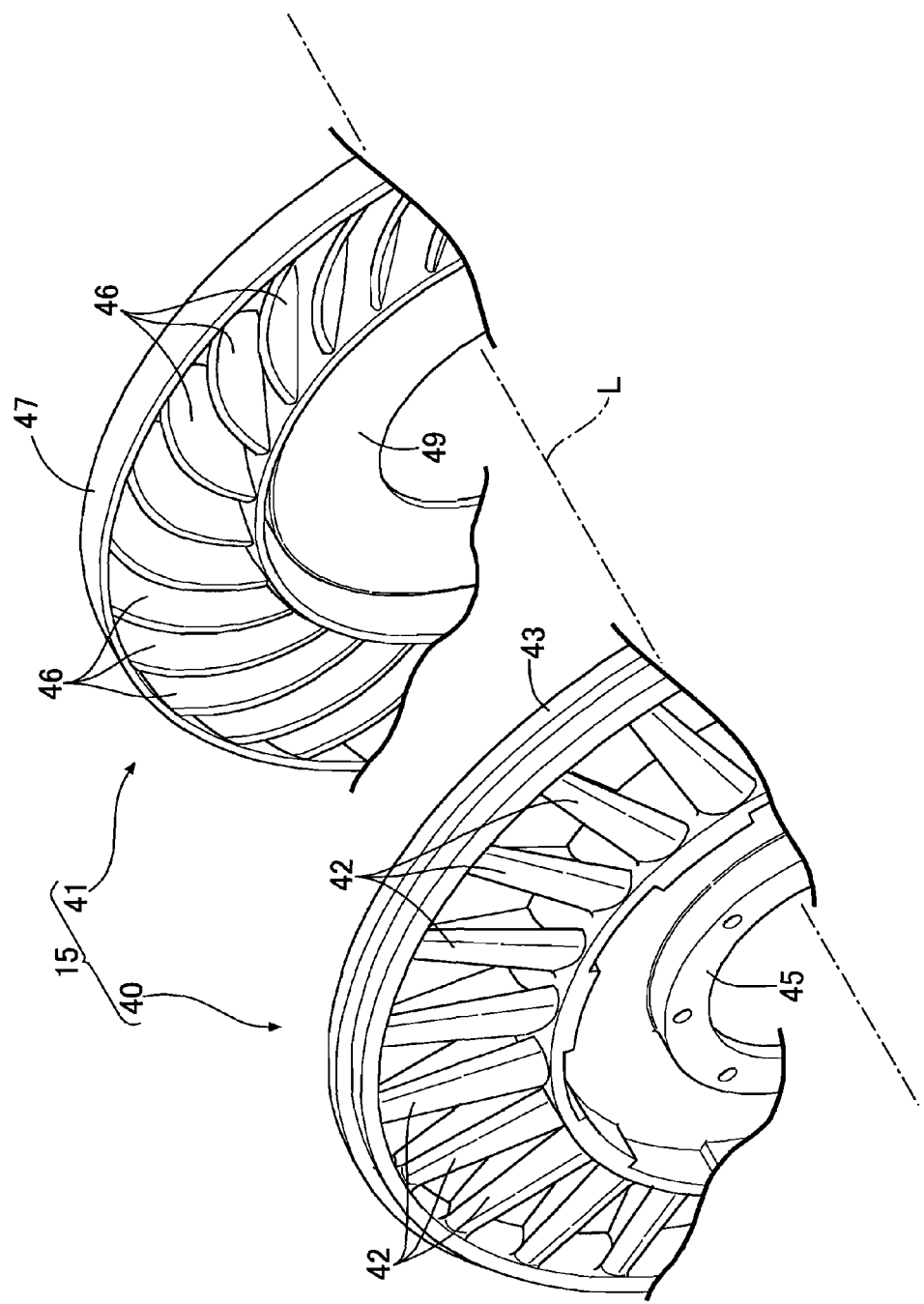
FIG. 2 is a perspective view of first and second stators. (first embodiment)

The specific structure of the first and second stators 40 and 41 is now explained by reference to FIG. 2 and FIG. 3.

The first stator 40 is a member that is made by die-casting, and the first stator core 43, the first stator boss 45, and the first stator blades 42 are formed as a unit. The airfoil of the first stator blade 42 is formed from a leading edge 42a that has a large radius of curvature, a trailing edge 42b that has a small radius of curvature, and a ventral surface 42c and dorsal surface 42d that join the leading edge 42a and the trailing edge 42b. When a large number of circles are drawn so as to be simultaneously tangential to the ventral surface 42c and the dorsal surface 42d of the airfoil of the first stator blade 42, and the diameter of the circles is defined as a blade thickness, the blade thickness of the airfoil of the present embodiment becomes a maximum in the leading edge 42a portion and a minimum in the trailing edge 42b portion.

On the other hand, with regard to the second stator 41, a second stator core 47, a second stator boss 49, and second stator blades 46 are separately produced by press forming a metal plate, and they are assembled as a unit by welding. Therefore, the airfoil formed from a leading edge 46a, a trailing edge 46b, a ventral surface 46c, and a dorsal surface 46d of the second stator blade 46 has a flat plate shape having a constant blade thickness that is equal to the plate thickness of the metal plate, a blade thickness t2 thereof being set so as to be smaller than a minimum blade thickness t1 of the first stator blade 42 (the blade thickness in the trailing edge 42b portion).

The number of second stator blades 46 is twice the number of first stator blades 42, a pitch P2 at which the second stator blades 46 are arranged therefore being half of a pitch P1 at which the first stator blades 42 are arranged. It is not necessary for the number of the second stator blades 46 to be an integral multiple of the number of the first stator blades 42 as long as the number of second stator blades 46 is larger than the number of first stator blades 42.

The first and second stators blades 42 and 46 are curved in the same direction so that, when the first stator blade 42 and the second stator blade 46 are aligned, the camber lines thereof are smoothly continuous.

The operation of the embodiment of the present invention having the above arrangement is now explained.

Figure 3:
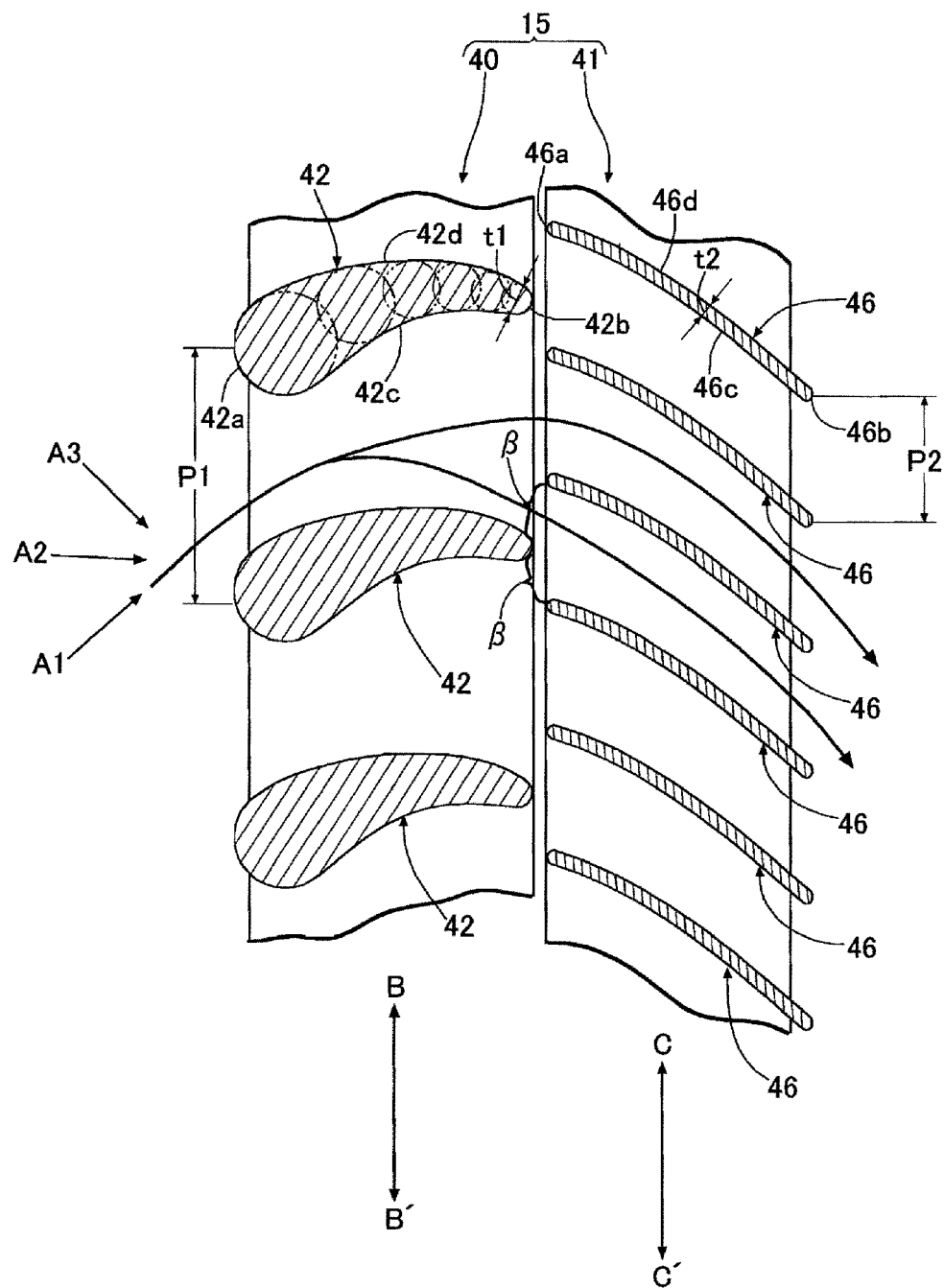
FIG. 3 is a sectional view along line 3-3 in FIG. 1. (first embodiment)

In a region where the speed ratio of the torque converter T is small, oil that has issued from the turbine runner 14 flows into the stator 15 from the direction of arrow A1 of FIG. 3, that is, in a direction along the camber line of the first stator blades 42 of the first stator 40. In this state, since the first stator blades 42 generate a lift in the direction of arrow B to engage the first one-way clutch 44, and the second stator blades 46 of the second stator 41 generate a lift in the direction of arrow C to engage the second one-way clutch 48, both the first stator 40 and the second stator 41 are non-rotatably restrained on the torque converter case 38. As a result, the direction in which oil flows out from the stator 15 deviates relative to the direction in which oil flows into the stator 15, and it becomes possible to make oil flow into the pump impeller 12, which is positioned on the downstream side thereof, at an appropriate angle.

When the speed ratio increases, since oil that has issued from the turbine runner 14 flows into the stator 15 from the direction of arrow A2 of FIG. 3, that is, from the dorsal surface 42*d* side of the first stator blades 42, there is a possibility that oil flow separation will occur on the ventral surface 42*c* side of the first stator blades 42, but the first one-way clutch 44 is disengaged due to the dorsal surfaces 42*d* of the first stator blades 42 being pushed by the flow of oil, and the first stator 40 thereby idles in an arrow B' direction. As a result, stalling of the first stator blades 42 is suppressed, and oil flows smoothly in a direction along the camber line of the second stator blades 46.

In this state, since the second stator blades 46 of the second stator 41 still generate a lift in the arrow C direction to engage the second one-way clutch 48, and the second stator 41 is non-rotatably restrained on the torque converter case 38, oil whose flow has been aligned by the second stator 41 can be made to flow into the pump impeller 12, which is positioned on the downstream side, at an appropriate angle.

Since, when the speed ratio further increases, oil that has issued from the turbine runner 14 flows into the stator 15 from the direction of arrow A3 of FIG. 3, that is, from the dorsal surface 46*d* side of the second stator blades 46, there is a possibility that oil flow separation will occur on the ventral surface 46*c* side of the second stator blades 46, but the second one-way clutch 48 is disengaged due to the dorsal surfaces 46*d* of the second stator blades 46 being pushed by the flow of oil, and the second stator 41 idles together with the first stator 40 in an arrow C' direction. As a result, stalling of the first stator blades 42 and the second stator blades 46 is suppressed, and oil that has passed through the stator 15 while being subjected to hardly any resistance flows into the pump impeller 12, which is positioned on the downstream side, at an appropriate angle.

As hereinbefore described, in accordance with the present embodiment, among the first and second stators 40 and 41, which are supported by the first and second one-way clutches 44 and 48 so that they can both idle, the first stator blades 42 of the first stator 40 have an airfoil that has a large blade thickness and is complete, and the second stator blades 46 of the second stator 41 have an airfoil that has an extremely small blade thickness and has a flat plate shape; it is therefore possible to ensure that there is a sufficiently large gap β (see FIG. 3) between the trailing edges 42*b* of the first stator blades 42 and the leading edges 46*a* of the second stator blades 46, thereby preventing the smooth flow of oil from being inhibited. Moreover, since the blade thickness of the second stator blades 46 is very small, the number thereof can be made more than the number of the first stator blades 42, and this enables the direction of flow of oil to be efficiently aligned by the second stator 41.

Figure 4:
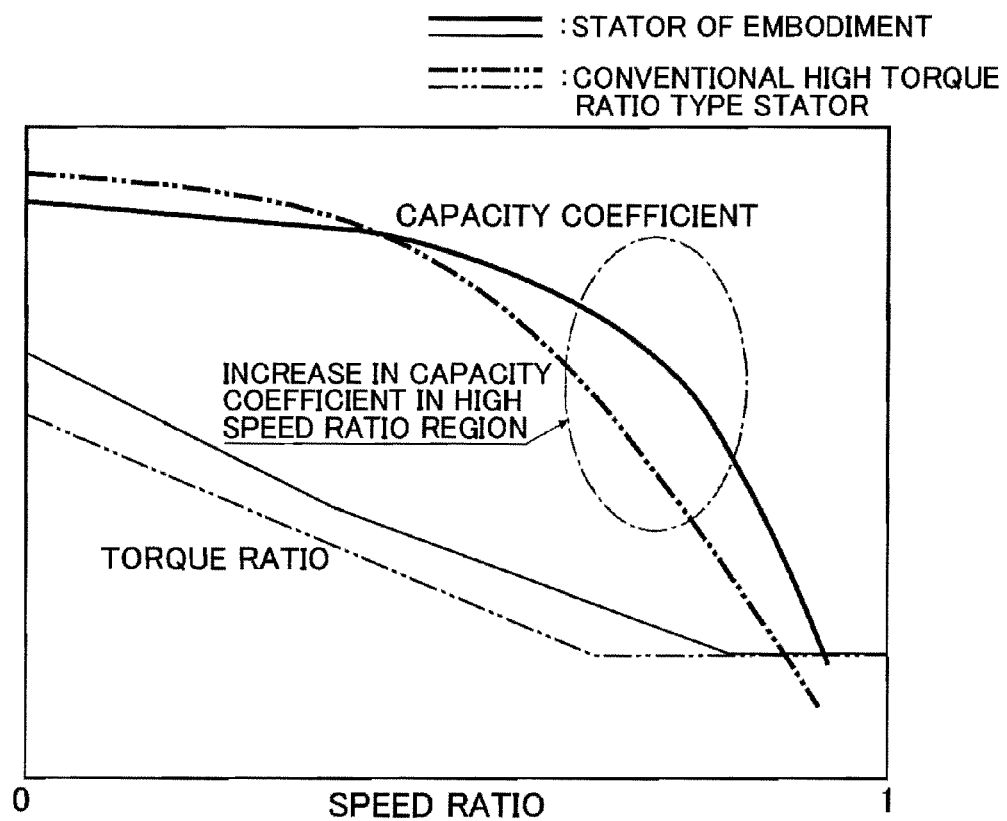
FIG. 4 is a graph comparing the performance of a stator of the embodiment with that of a conventional high torque ratio type stator. (first embodiment)
Figure 14:
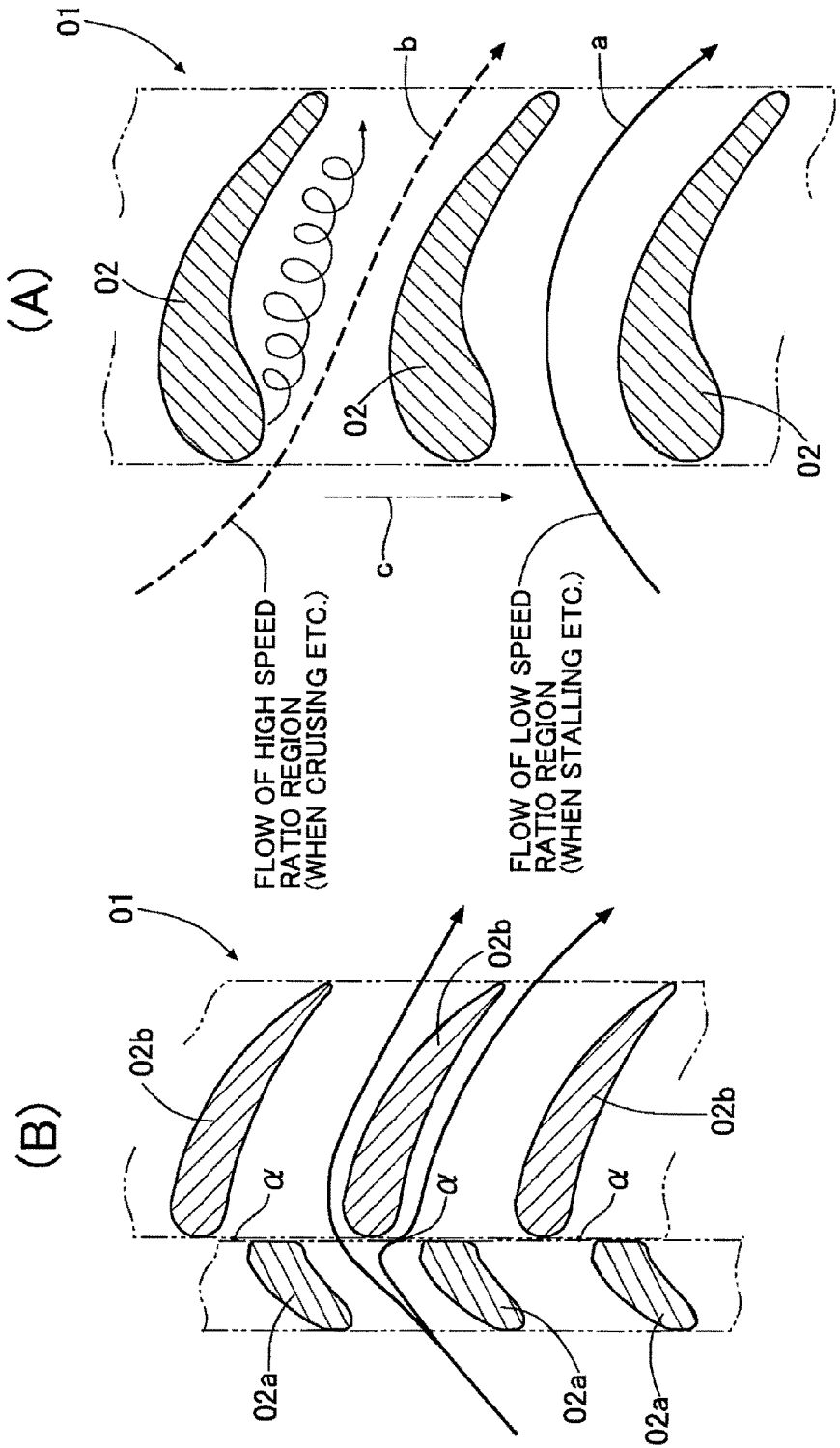
FIG. 14 is a diagram showing a stator of a conventional torque converter. (conventional example)
Figure 15:
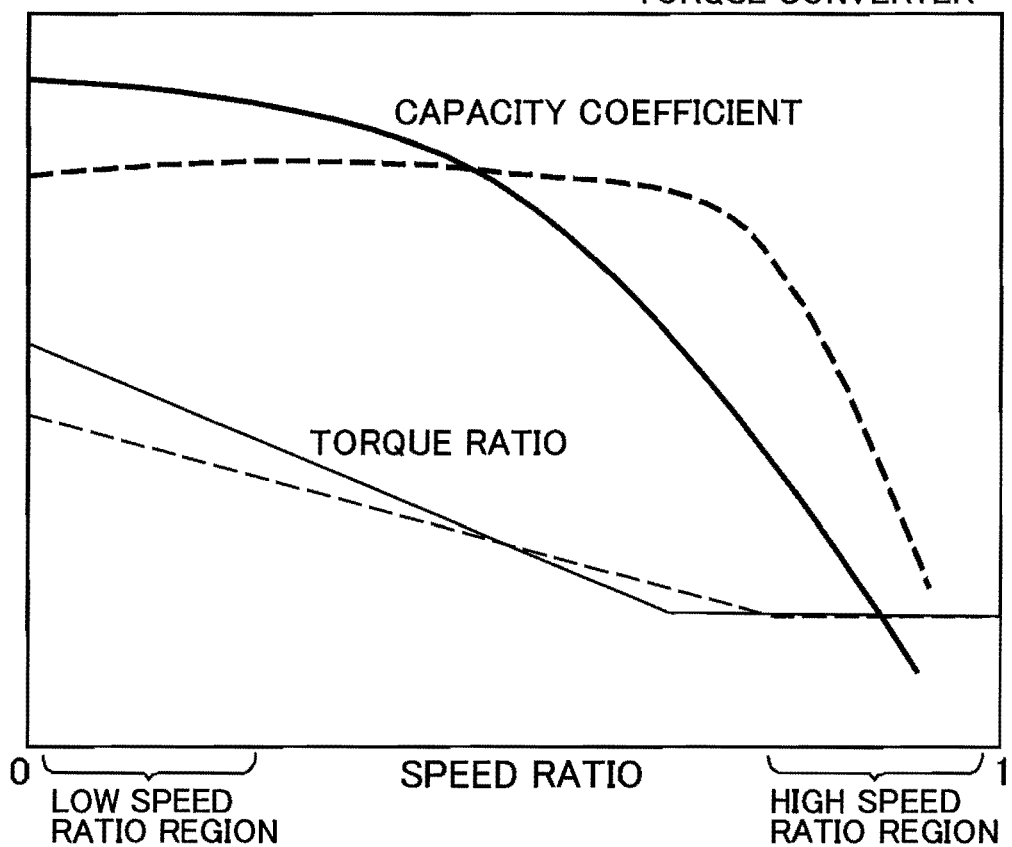
FIG. 15 is a graph showing torque ratio and capacity coefficient characteristics of the conventional torque converter. (conventional example)

FIG. 4 is a graph comparing the performance of a stator 01 of a high torque ratio type torque converter shown in FIG. 14 (A) with that of the stator 15 of the present embodiment. It can be seen from this figure that, in accordance with the present embodiment, a higher torque ratio than that of the conventional example can be ensured for the entire speed ratio region, and although the capacity coefficient decreases slightly in the low speed ratio region compared with the conventional example, in medium and high speed ratio regions in particular the capacity coefficient greatly increases relative to the conventional example.

Figure 5:
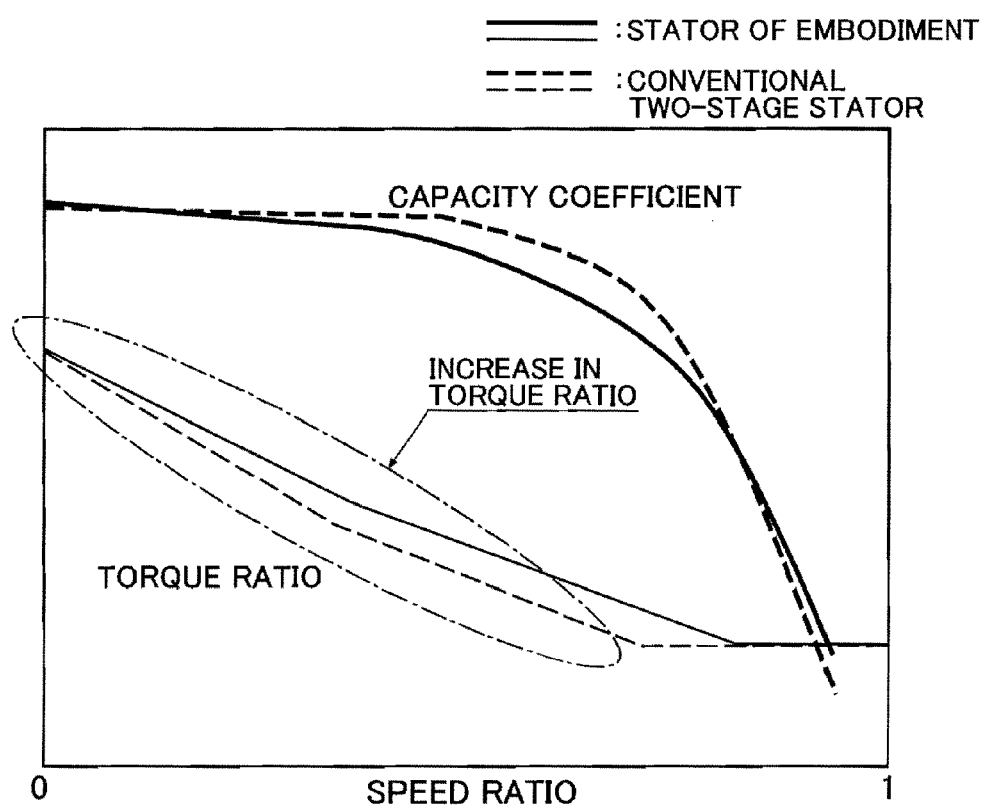
FIG. 5 is a graph comparing the performance of the stator of the embodiment with that of a conventional two-stage stator. (first embodiment)

FIG. 5 is a graph comparing the performance of a stator 01 of a conventional two-stage stator type torque converter shown in FIG. 14 (B) with that of the stator 15 of the present embodiment. It can be seen from the figure that, in accordance with the present embodiment, while ensuring a capacity coefficient that is comparable to that of the conventional example for the entire speed ratio region, the torque ratio increases particularly in the low and medium speed ratio regions relative to the conventional example.

Furthermore, in accordance with the present embodiment, since the stator 15 is divided into the first stator 40 and the second stator 41, warpage of the first stator blades 42, which are made by die-casting, becomes small, and when forming the first stator 40 as a unit by die-casting such that an undercut portion is not formed, the structure of a mold can be simplified, thus reducing the production cost. Moreover, with regard to the second stator 41, the second stator blades 46 can also be produced simply using a press mold, and the production cost can therefore be cut.

Second embodiment

Figure 6:
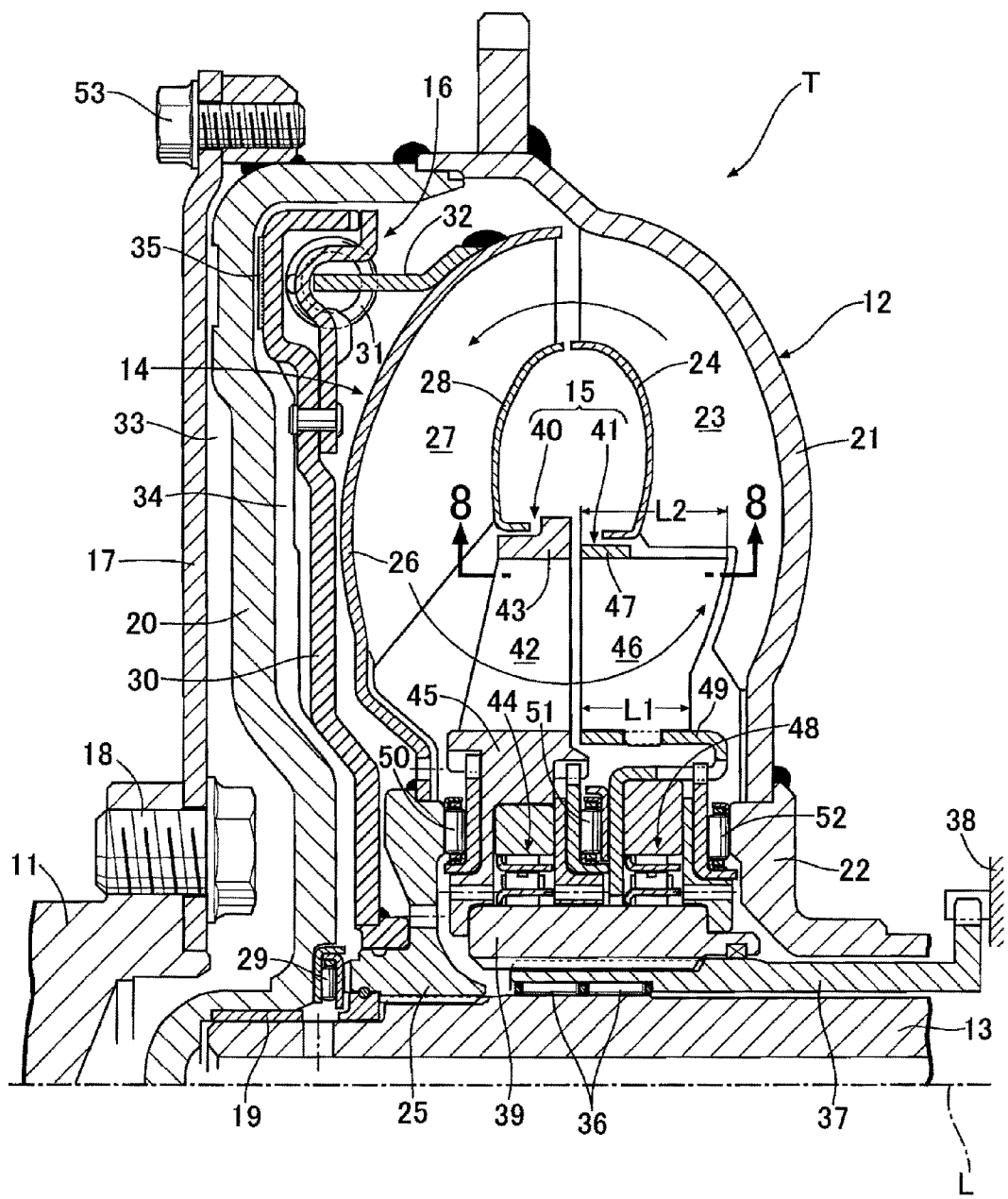
FIG. 6 is a vertical sectional view of a torque converter. (second embodiment)
Figure 7:
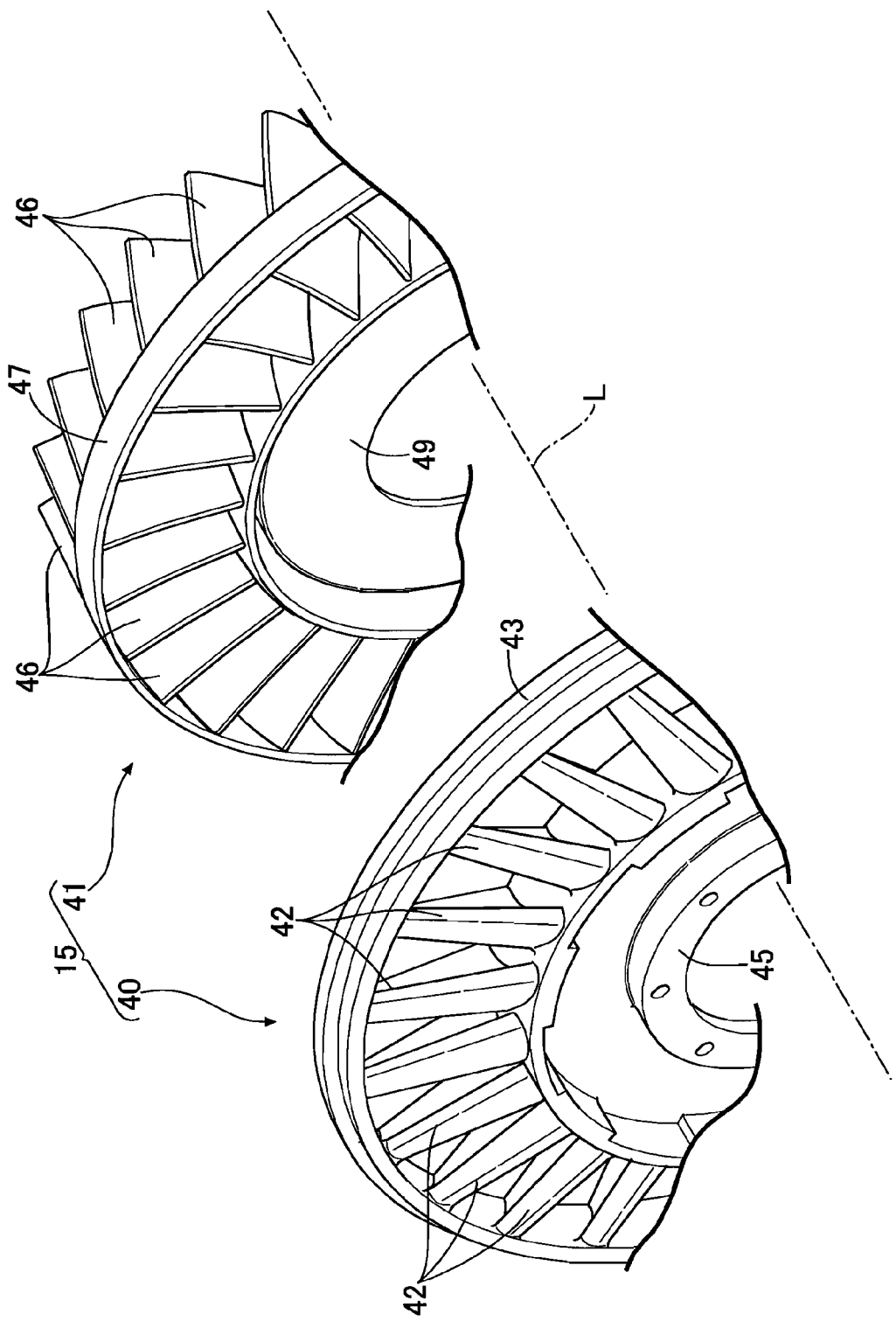
FIG. 7 is a perspective view of first and second stators. (second embodiment)
Figure 8:
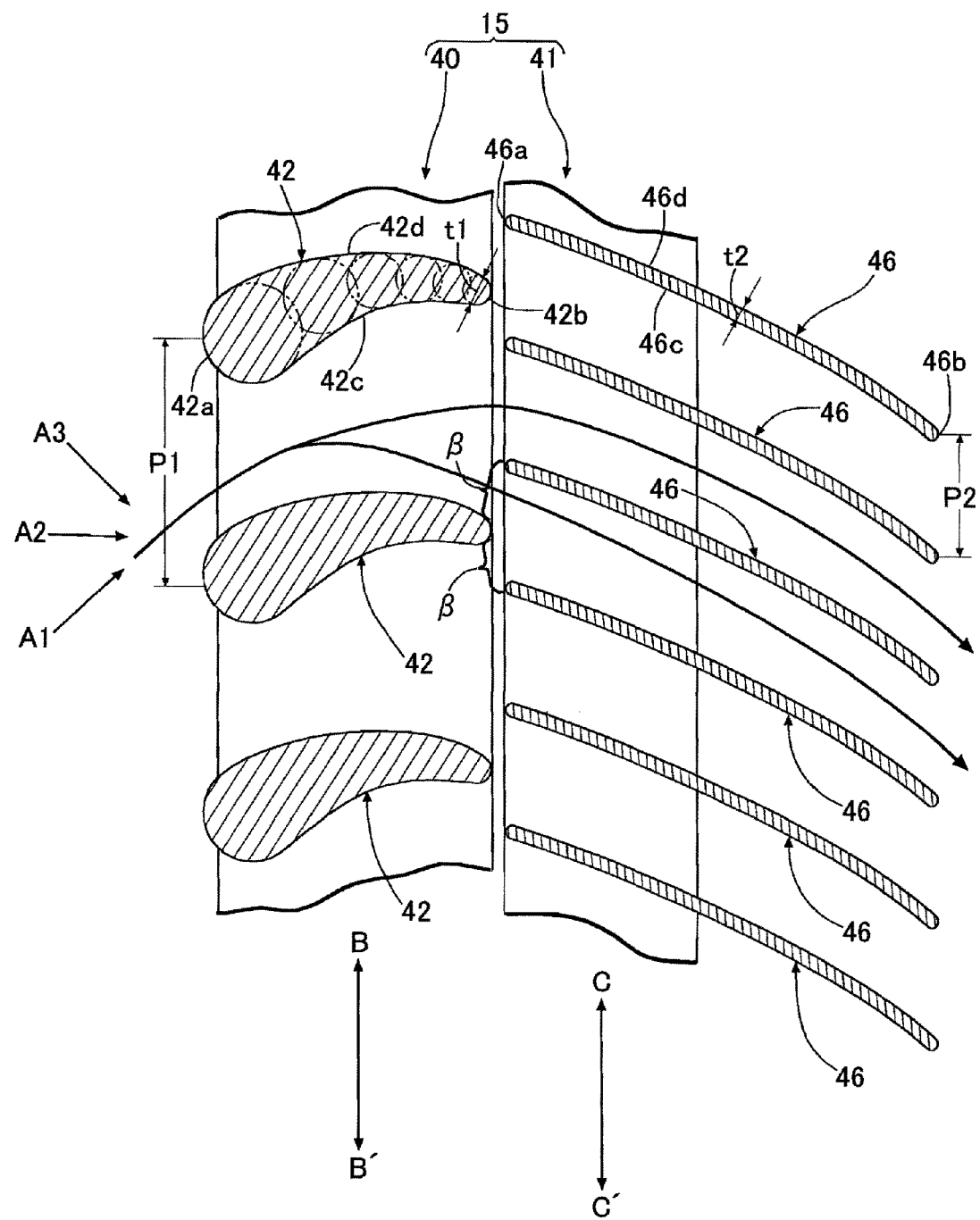
FIG. 8 is a sectional view along line 8-8 in FIG. 6. (second embodiment)
Figure 9:
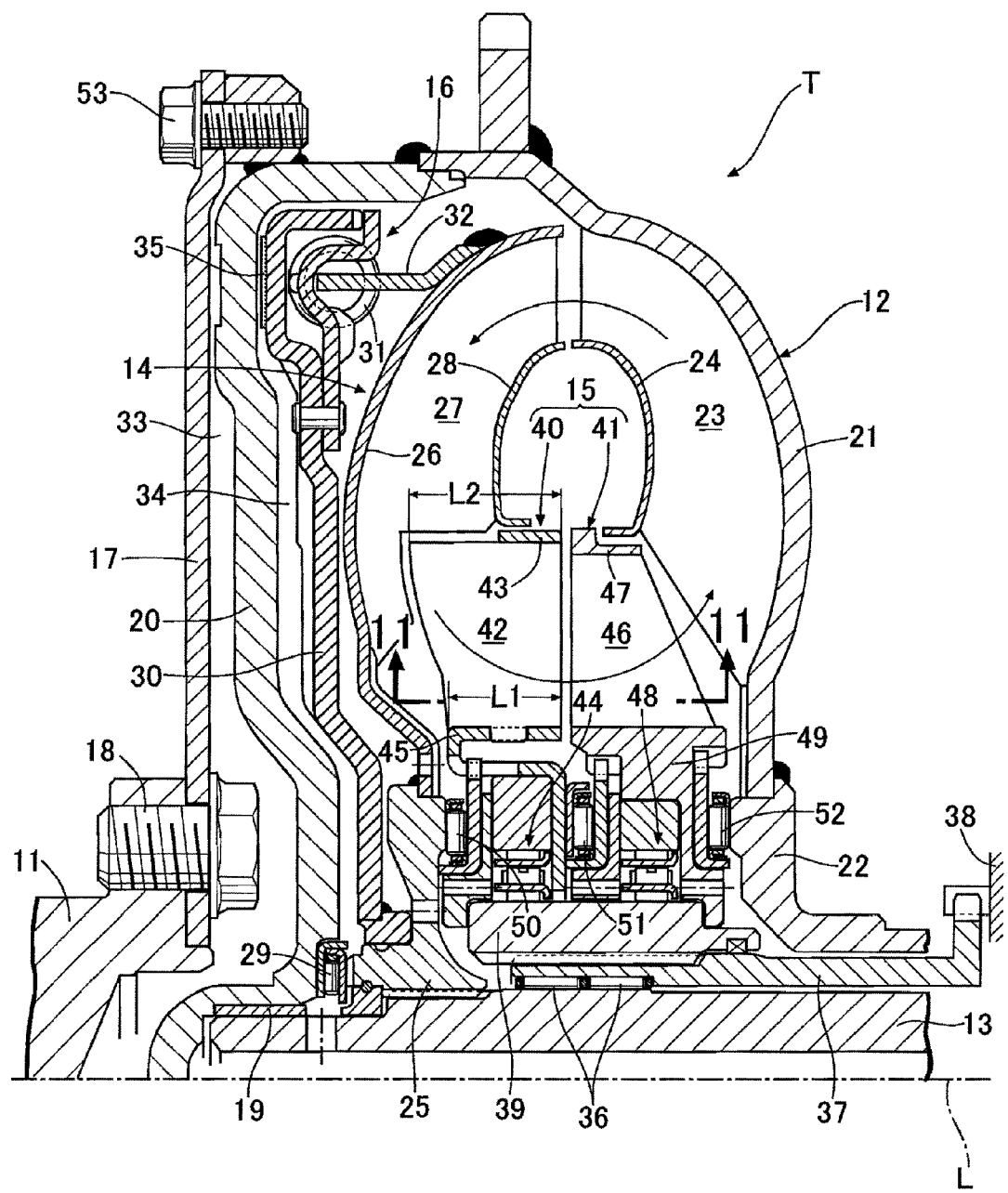
FIG. 9 is a vertical sectional view of a torque converter. (third embodiment)
Figure 10:
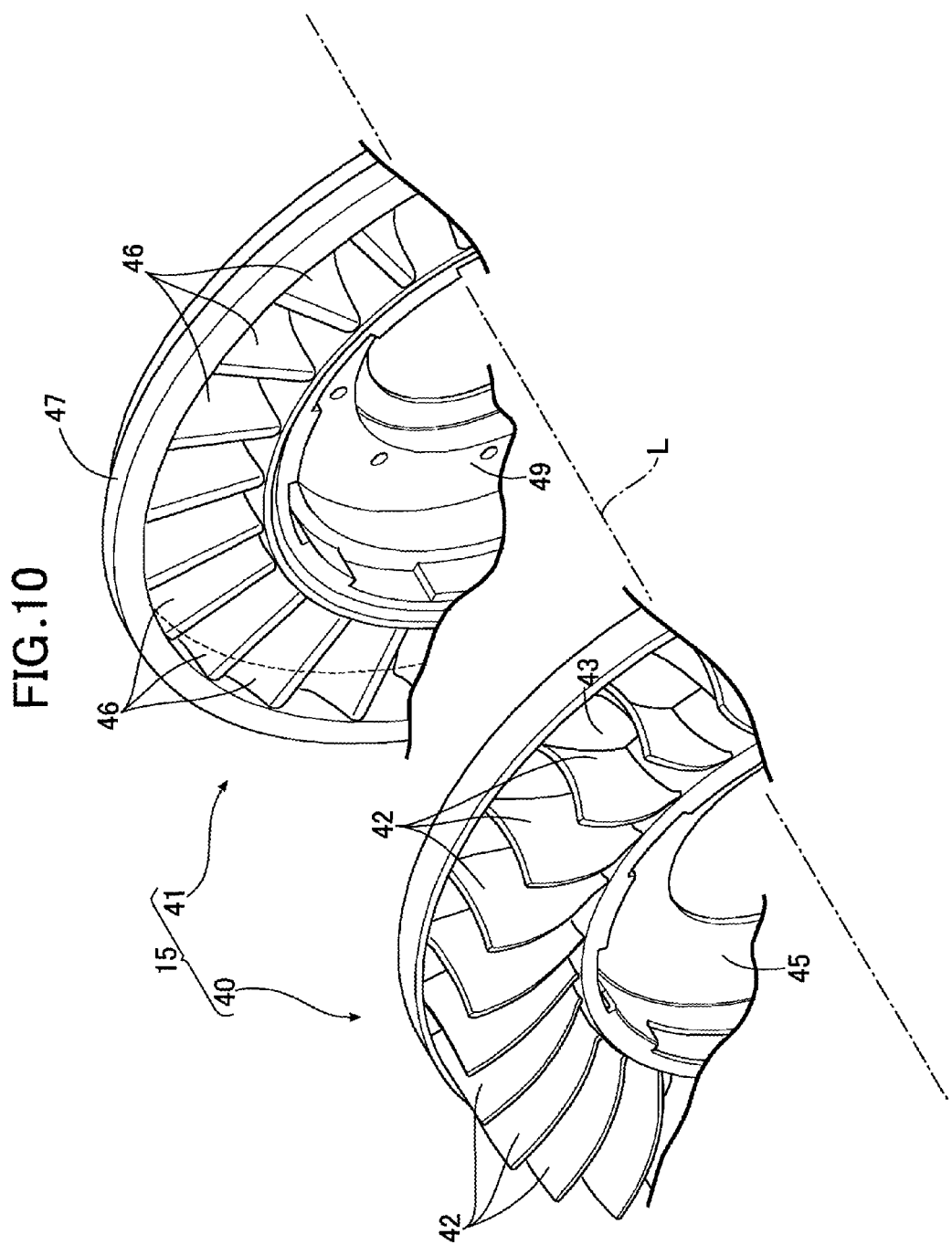
FIG. 10 is a perspective view of first and second stators. (third embodiment)
Figure 11:
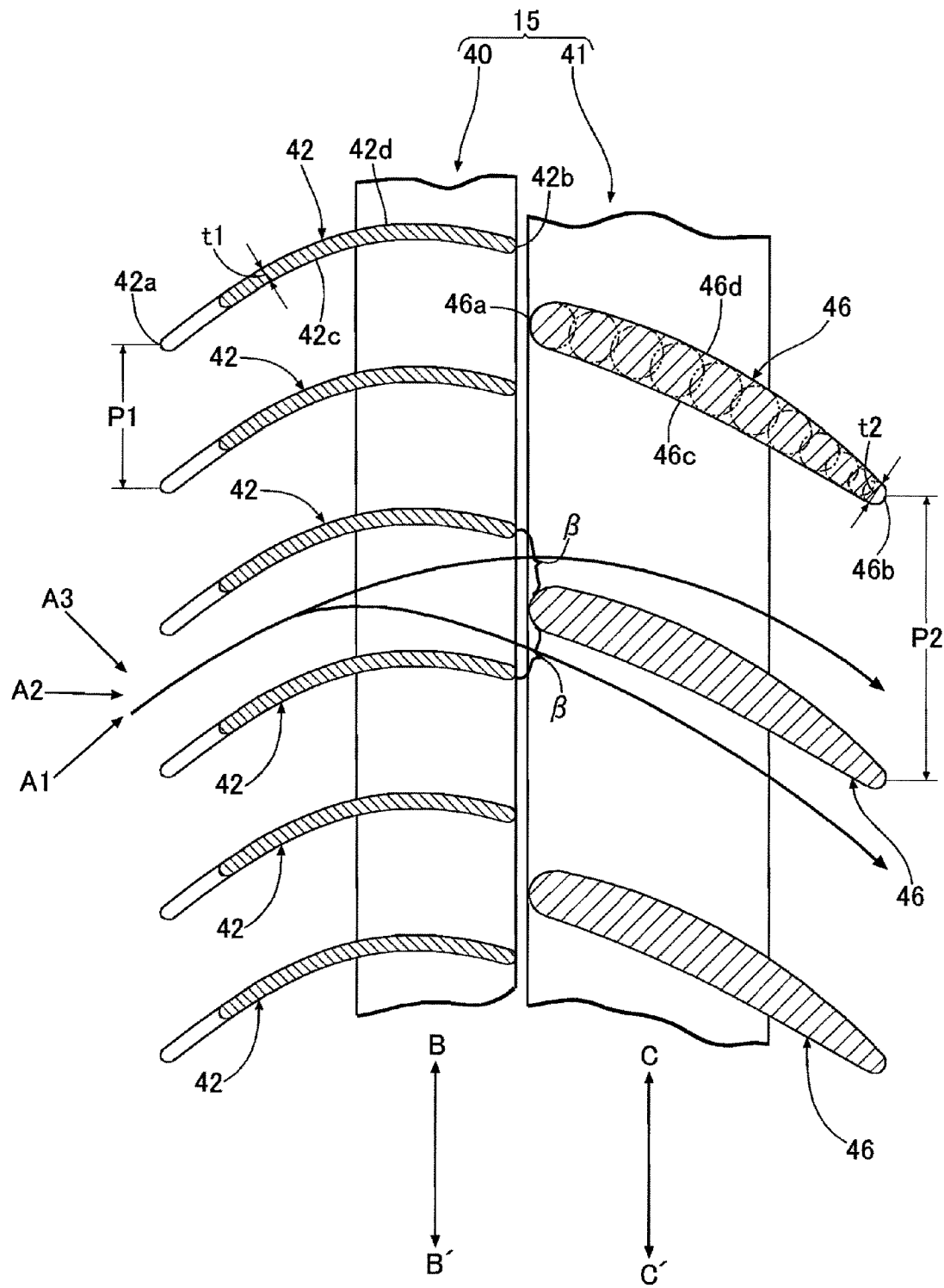
FIG. 11 is a sectional view along line 11-11 in FIG. 9. (third embodiment)

A second embodiment of the present invention is now explained by reference to FIG. 6 to FIG. 8.

The second embodiment is different from the first embodiment in terms of the shape of second stator blades 46 of a second stator 41, the arrangement otherwise being the same as that of the first embodiment.

With regard to the second stator blades 46 of the second embodiment, a chord length L2 of a radially outer side portion is larger than a chord length L1 of a radially inner side portion. This enables the flow of oil to be aligned by means of the second stator blades 46 more effectively. If an attempt were to be made to produce the second stator blades 46 with such a shape by die casting, since it would be difficult to carry out release from a mold, the structure of the mold would become complicated, but they can easily be produced by metal plate pressing.

Third embodiment

A third embodiment of the present invention is now explained by reference to FIG. 9 to FIG. 13.

In the first embodiment, the first stator blades 42 of the first stator 40 have a complete airfoil that has a large blade thickness, and the second stator blades 46 of the second stator 41 have a flat plate-shaped airfoil that has a very small blade thickness, but in the third embodiment the relationship is reversed.

That is, with regard to a first stator 40, a first stator core 43, a first stator boss 45, and first stator blades 42 are produced separately by press forming a metal plate and they are assembled as a unit by welding. Therefore, the airfoil formed from a leading edge 42*a*, a trailing edge 42*b*, a ventral surface 42*c*, and a dorsal surface 42*d* of the first stator blade 42 has a flat plate shape having a constant blade thickness that is equal to the plate thickness of the metal plate.

On the other hand, a second stator 41 is a member that is made by die-casting, and a second stator core 47, a second stator boss 49, and second stator blades 46 are formed as a unit. The airfoil of the second stator blade 46 is formed from a leading edge 46*a* that has a large radius of curvature, a trailing edge 46*b* that has a small radius of curvature, and a ventral surface 46*c* and dorsal surface 46*d* that join the leading edge 46*a* and the trailing edge 46*b*. When a large number of circles are drawn so as to be simultaneously tangential to the ventral surface 46*c* and the dorsal surface 46*d* of the airfoil of the second stator blade 46, and the diameter of the circles is defined as a blade thickness, the blade thickness of the airfoil of the present embodiment becomes a maximum for a portion to the rear of the leading edge 46*a* and a minimum for the trailing edge 46*b* portion. A blade thickness t1 of the first stator blade 42 is set so as to be smaller than a minimum blade thickness t2 (blade thickness for the trailing edge 46*b* portion) of the second stator blade 46.

The number of first stator blades 42 is twice the number of second stator blades 46, and a pitch P1 at which the first stator blades 42 are arranged is therefore half a pitch P2 at which the second stator blades 46 are arranged. The number of first stator blades 42 need not to be an integral multiple of the number of second stator blades 46 as long as the number of first stator blades 42 is larger than the number of second stator blades 46.

The first stator blade 42 and the second stator blade 46 are curved in the same direction so that camber lines of the first and second stators blades 42 and 46 are smoothly continuous when they are aligned.

Figure 12:
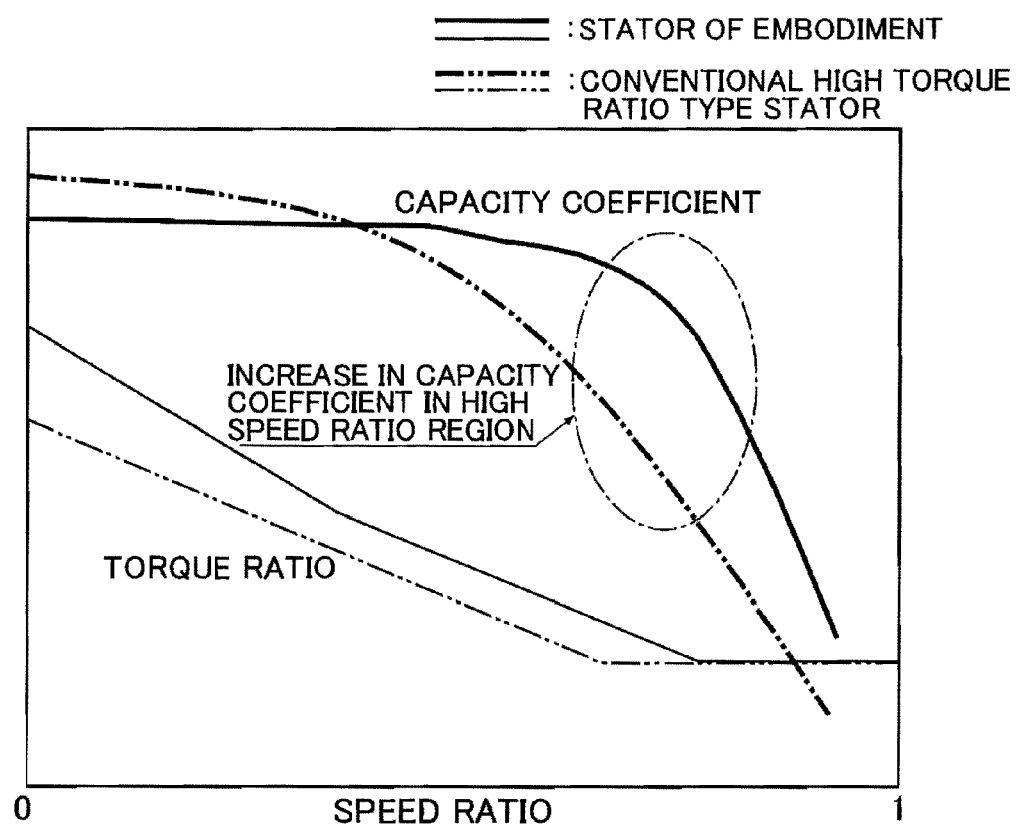
FIG. 12 is a graph comparing the performance of a stator of the embodiment with that of a conventional high torque ratio type stator. (third embodiment)

FIG. 12 corresponds to FIG. 4 of the first embodiment and is a graph comparing the performance of the stator 01 of the conventional high torque ratio type torque converter shown in FIG. 14 (A) with that of a stator 15 of the third embodiment. It can be seen that, in accordance with the present embodiment also, as in the first embodiment, a higher torque ratio than that of the conventional example can be ensured for the entire speed ratio region, and although the capacity coefficient decreases slightly in a low speed ratio region compared with the conventional example, the capacity coefficient increases greatly in medium and high speed ratio regions in particular.

In addition, in the third embodiment the increase in capacity coefficient in the large speed ratio region is more prominent than in the first embodiment (see FIG. 4). The reason therefor is that, when the first stator 40 idles in the large speed ratio region, the characteristics of the second stator 41 greatly influence the performance, and in the third embodiment since the pitch P2 at which the second stator blades 46 are arranged is large, the flow rate of oil increases.

Figure 13:
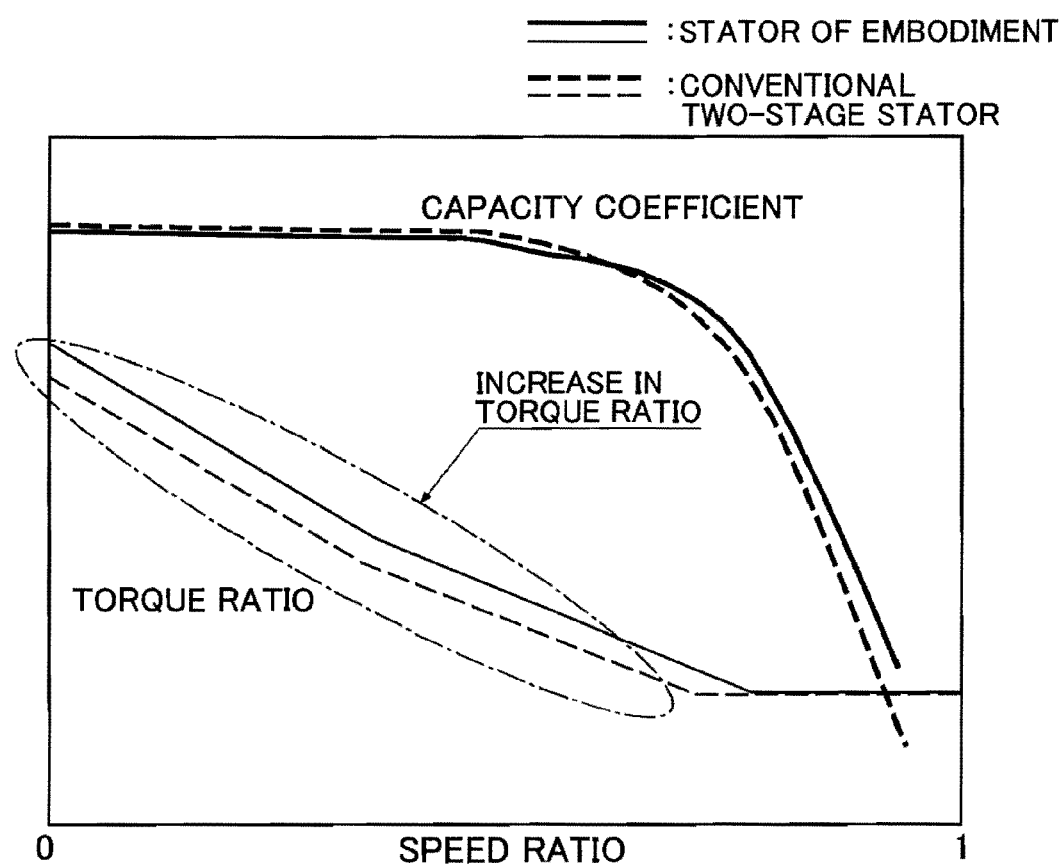
FIG. 13 is a graph comparing the performance of the stator of the embodiment with that of a conventional two-stage stator. (third embodiment)

FIG. 13 corresponds to FIG. 5 of the first embodiment and is a graph comparing the performance of the stator 01 of the conventional two-stage stator type torque converter shown in FIG. 14 (B) with that of the stator 15 of the third embodiment. It can be seen that, in accordance with the present embodiment also, as in the first embodiment, while ensuring a capacity coefficient that is comparable to that of the conventional example for all speed ratio regions, the torque ratio increases compared with the conventional example particularly in the low and medium speed ratio regions.

In addition, in the first embodiment (see FIG. 5) the increase in torque ratio in the large speed ratio region is more prominent than in the third embodiment. The reason therefor is that, when the first stator 40 idles in the large speed ratio region, the characteristics of the second stator 41 greatly influence the performance, and since in the first embodiment the pitch P2 at which the second stator blades 46 are arranged is small the direction of flow of oil is greatly deflected.

Apart from the above, the third embodiment can also achieve the same effects as those of the first embodiment by the same operation.

Moreover, with regard to the first stator blades 42 of the third embodiment, a chord length L2 for a radially outer portion is larger than a chord length L1 for a radially inner portion. This enables the flow of oil to be aligned by means of the first stator blades 42 more effectively.

Embodiments of the present invention are explained above, but the present invention may be modified in a variety of ways as long as the modifications do not depart from the spirit and scope thereof.

For example, instead of producing the first stator blades 42 or the second stator blades 46 by pressing of plate metal, they may be produced by stereolithography.

The invention claimed is:

1. A torque converter stator structure comprising a pump impeller that is connected to a drive source and rotates around an axis, a turbine runner that is connected to an input of a transmission and rotates around the axis, and a stator that is disposed between the pump impeller and the turbine runner, the stator comprising a first stator that is positioned on the upstream side in the direction of circulation of oil and a second stator that is positioned on the downstream side in the direction of circulation, and the first and second stators being supported on a fixed part via corresponding one-way clutches, wherein, the number of blades of one stator of the first and second stators is larger than the number of blades of the other stator, and the maximum value for blade thickness of the blade of said one stator is smaller than the minimum value for blade thickness of the blade of said other stator.

2. The torque converter stator structure according to claim 1, wherein the length in the axis direction of a radially outer end part of the blade of said one stator is larger than the length in the axis direction of a radially inner end part of the blade.

3. The torque converter stator structure according to claim 1, wherein the blade of said one stator is made by metal plate pressing and the blade of said other stator is made by die-casting.

4. The torque converter stator structure according to claim 2, wherein the blade of said one stator is made by metal plate pressing and the blade of said other stator is made by die-casting.

* * * * *